United States Patent Office 3,520,538
Patented July 14, 1970

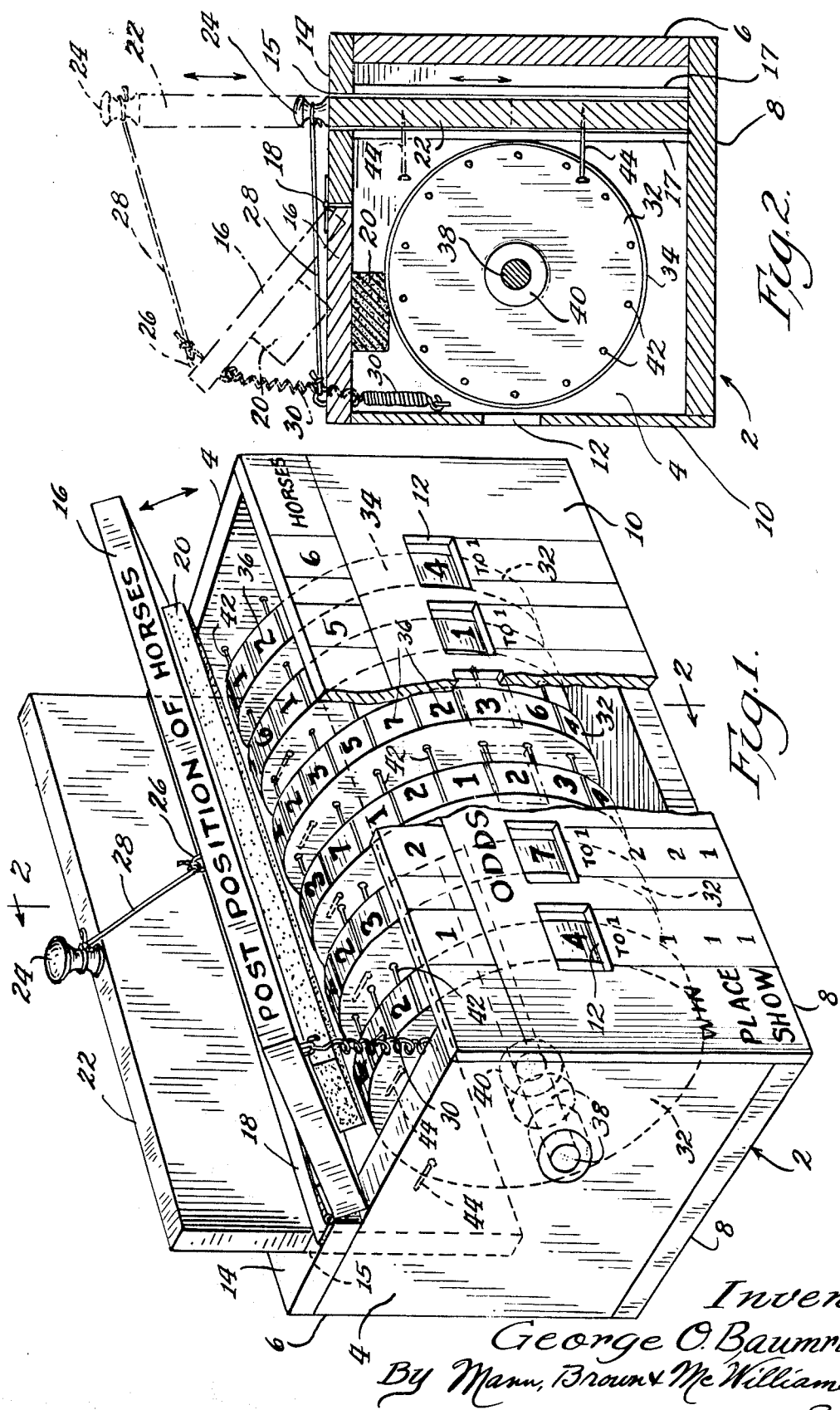

---

3,520,538
ODDS DEVICE FOR HORSE RACE GAME
George O. Baumrucker, 30 S. County Line Road,
Hinsdale, Ill. 60521
Filed Sept. 16, 1968, Ser. No. 762,204
Int. Cl. A63f 1/18
U.S. Cl. 273—143                               10 Claims

ABSTRACT OF THE DISCLOSURE

A housing having a pivotally mounted cover portion contains a plurality of wheels mounted on a transverse shaft within the housing for independent rotation. The wheels, having a plurality of radially spaced pins, are activated by a vertically reciprocally movable member mounted transversely within the housing in guide rails. A row of spaced pins on the reciprocal member, one for each wheel, engages the radially spaced pins on the wheels for spinning the wheels when the reciprocal member is moved. The cover portion, which is connected to the reciprocal member by a line member such as a string, has a material such as sponge rubber mounted on its underside so as to frictionally engage a portion of the peripheral surface of the wheels for braking purposes when the cover portion closes, which closing is aided by a spring. The peripheral surface of each wheel, as well as that exterior portion of the housing located adjacent to windows in the housing, are provided with number indicia the readout of which indicates odds for a horse race game or the like.

BACKGROUND OF THE INVENTION

While there are many devices known in the prior art for providing random indicia for use in amusement games and the like, such as bingo and other types of amusement pastimes, the great bulk of these devices are usually very complicated in operation employing intermeshing gears, elaborate linkages and other components, each of which requires special machining and which, consequently, increases the cost thereof.

Now with the herein disclosed invention, a simple device, which may be made at low cost, is provided for use in conjunction with a multitude of games requiring the random provision of numbers or other indicia and more particularly for use with an amusement device such as a horse race game as disclosed and illustrated in co-pending U.S. application Ser. No. 703,987, filed Feb. 8, 1968, of which the instant applicant and the applicant of that application are the same. While the device of this invention will be described as it specifically relates to the horse race aspect and, more specifically, to the determination of odds in such horse race game, it is not to be specifically limited thereto.

SUMMARY OF THE INVENTION

Basically, this invention relates to a game or toy apparatus comprising the combination with a housing of a plurality of wheels mounted for rotation independently of one another within the housing. Each of the wheels is provided with an indicia bearing surface which can be adapted to bear a number or symbol indicia and each of the wheels have spaced extending members which are adapted to be engaged by a plurality of spaced like extending members mounted on a vertically, reciprocally mounted member extending transverse of and within the housing. The housing also has a pivotally mounted cover portion adapted to pivotally move in response to the vertical movement of the reciprocally mounted member. This cover portion has a depending extension or member extending into the housing to frictionally engage a portion of the peripheral surface of each of the wheels to prohibit revolving movement thereof. The housing is provided with windows or apertures in one side thereof to expose the indicia bearing periphery of the wheels mounted therein.

BRIEF DESCRIPTION OF THE DRAWINGS

FIG. 1 is a perspective view of a specific embodiment of the apparatus of this invention as it relates to a race horse game; and FIG. 2 is a side view of the apparatus of FIG. 1 taken along the line 2—2 showing in phantom lines the basic and simple movement mechanisms involved.

DESCRIPTION OF THE PREFERRED EMBODIMENTS

Referring specifically to the figures wherein like numerals of reference indicate like parts throughout, there is illustrated one form of the invention in its most uncomplicated, unsophisticated state. Housing 2, here indicated as being fabricated of wood, comprises side end panels 4, back panel 6, bottom panel 8 and front panel 10 with a plurality of spaced windows or apertures 12, and a rearward cover portion 14, and a pivotally mounted forward cover portion 16. It will be noted that pivotally mounted forward cover portion 16 is hinged as at 18 and has depending extending portion or member 20 made of a high coefficient friction material such as sponge rubber or the like. The rear cover portion 14 is notched out or slotted as at 15 to accommodate reciprocally mounted member 22 having knob 24 secured thereon which may be easily grasped by the thumb and forefinger of the human hand. Spaced and extending rail portions 17 (not shown in perspective for reasons of clarity) are secured to the inside side wall of the end members 4 in order to form a track or guide in which the member 22 may move and be positively guided.

Pivotally mounted cover portion 16 is provided with an anchoring means such as U-bracket 26 adapted to have secured thereto a line member or string 28 which is, in turn, secured to knob 24 as by means of tying. It is apparent that as the member 22 reciprocates into the upward position, the cover portion 16 pivots or opens about the hinge 18. Cover portion 16 is biased to the closed position as by means of spring 30, which spring may be secured to the end member or side panels.

Disposed within the housing 2 are a plurality of wheels 32, each having a thickness and forming a peripheral surface 34 which may carry indicia such as the spaced numbers 36. Each of the wheels 32 are freely rotatable on shaft 38 which may be journalled in side panels 4. It will be noted that each of the wheels 32 are freely rotatable on the shaft 38. In order to keep the wheels 32 in proper spaced relation, annular spacers 40 are provided. Radially spaced adjacent the periphery 34 of each of the wheels 32 are extending members such as pins 42, the spacing being such as not to contact the adjacent wheel and being spaced so that they may engage a similar extending member such as a plurality of spaced pins 44 secured to the reciprocally mounted member preferably in single row fashion. Spacing of the pins 42 on each of the wheels and the row of pins 44 on member 22 are such that through coaction a single indicia 36 will register and show in each of the windows or apertures 12. Towards this end, it will be seen that the depending frictional member 20 will maintain a set position of each of the individual wheels with respect to the apertures or windows 12.

It will be noted that the front face of the apparatus is designed and illustrated for use in conjunction with an amusement device such as a facsimile horse race game. The various lines on the bottom of the front face 10 indicate by rows of numbers the odds which a particular horse will have in a particular race. The end edge of the pivotally mounted cover 16 designating, for instance, the post position of the horses.

The operation of the device is simplicity in itself and can be readily ascertained paying particular attention to FIG. 2. In FIG. 2 the phantom lines indicate the relative position of the movable actuating mechanism of the device. The full lines position of the vertically reciprocated member 22 shows the pin 44 in spaced relation to the radially spaced pins 42 secured to the wheel 32. As the member 22 is raised in direction of the arrow, the pivoted, mounted cover portion 16 is raised so that the depending foam rubber element 20 moves out of contact with the peripheral surface 34 of the wheels 32. During the upward movement, the pins 44 engage at least one of the pins 42 on each of the wheels providing a revolving force or moving impetus to the freely mounted wheels such that they randomly spin around in free fashion. In order to stop the spinning movement of the wheels and assuming that a long lapse of time does not transpire since friction will, of course, slow them down, the vertically reciprocating member 22 is moved to the full line position and is added in this respect by the spring biasing means 30. In moving the member 22 down to the rest position, this lowers the pivotally mounted cover portion 16 to the point where the depending portion will engage the peripheral surface 34 of the wheels 32 to stop them from moving and because of the positioning of the pins 44 on the vertical member 22 and the placement of the pins 42 on each of the wheels, a specific indicia will appear in the apertures or windows 12 in the front panel of the housing 2. Instead of individual apertures or windows a single lateral slot may, of course, be provided.

In this manner, therefore, it is seen that a multitude of indicia may be arbitrarily and randomly provided and ascertained through an apparatus of simple and low cost design and construction. Other ramifications and alternatives will at once suggest themselves to those of ordinary skill in the art. Such modifications and variations will not detract from the spirit and scope of the invention and are intended to be covered by the appended claims.

The embodiments of this invention in which an exclusive property or privilege is claimed are defined as follows:

1. A toy or game apparatus comprising, the combination with a housing, a plurality of wheels mounted for rotation independently of one another within said housing, each of said wheels being provided with an indicia bearing periphery, each of said wheels having spaced extending members disposed so as to be engaged by a plurality of spaced, like extending members mounted on a vertically, reciprocally mounted member extending transverse of and within said housing when said reciprocally mounted member is reciprocated, said housing having a pivotally mounted cover portion with means adapted to pivotally move it in response to the vertical movement of said reciprocally mounted member and having a depending portion extending into said housing to frictionally engage a portion of the peripheral surface of said wheels when said cover portion is closed to prohibit revolving movement thereof, said housing having windows in one side thereof to expose said indicia bearing periphery of said wheels therein.

2. The apparatus in accordance to claim 1 wherein said vertically reciprocally mounted member is supported by spaced rail members secured to the side end walls of said housing thereby forming a slot in which said reciprocally mounted member travels.

3. The apparatus in accordance with claim 2 wherein said reciprocally mounted member has an upwardly extending knob adapted to be grasped by the thumb and forefinger of the human hand, the upward movement of said member imparting revolving movement to said wheels and downward movement positioning said indicia bearing surfaces in said windows of said housing.

4. The apparatus in accordance with claim 3 wherein the number of like extending members on said reciprocally mounted member is equal to the number of said wheels.

5. The apparatus in accordance with claim 4 wherein said extending members on said wheels are a plurality of radially spaced pins, the spacing of said pins relative to said like extending members being such as to position a discrete portion of said indicia bearing periphery of each of said wheels in each of said windows when said reciprocally mounted member is in its lowermost position.

6. The apparatus in accordance with claim 5 wherein said means spring biases said pivotally mounted cover portion into the closed position.

7. The apparatus in accordance with claim 6 wherein each of said wheels are mounted on a shaft journalled in the side end walls of said housing.

8. The apparatus in accordance with claim 7 wherein said depending portion of said pivotally mounted cover portion is a high coefficient of friction material such as rubber.

9. The apparatus in accordance with claim 8 wherein said means includes a line member secured to said knob of said vertically reciprocally mounted member and said pivotally mounted cover portion.

10. The apparatus in accordance with claim 9 wherein the peripheral surface of each of said wheels and the face of said housing adjacent said windows are provided with number indicia to indicate odds for a horse race game or the like.

References Cited

UNITED STATES PATENTS

| | | | |
|---|---|---|---|
| 518,316 | 4/1894 | Grove | 273—143 |
| 518,469 | 4/1894 | Rabiger | 273—143 X |
| 2,969,610 | 1/1961 | Weiner | 273—143 X |

FOREIGN PATENTS

| | | |
|---|---|---|
| 644,818 | 10/1950 | Great Britain. |

ANTON O. OECHSLE, Primary Examiner

A. W. KRAMER, Assistant Examiner